(12) United States Patent
Adam et al.

(10) Patent No.: US 10,864,910 B2
(45) Date of Patent: Dec. 15, 2020

(54) AUTOMATED DRIVING SYSTEMS AND CONTROL LOGIC USING SENSOR FUSION FOR INTELLIGENT VEHICLE CONTROL

(71) Applicant: GM Global Technology Operations LLC, Detroit, MI (US)

(72) Inventors: Paul A. Adam, Milford, MI (US); Tetyana V. Mamchuk, Walled Lake, MI (US); Dmitriy Feldman, West Bloomfield, MI (US); Robert C. Baraszu, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 307 days.

(21) Appl. No.: 15/981,464

(22) Filed: May 16, 2018

(65) Prior Publication Data

US 2019/0351899 A1    Nov. 21, 2019

(51) Int. Cl.
*B60W 30/095* (2012.01)
*B60W 60/00* (2020.01)
(Continued)

(52) U.S. Cl.
CPC .......... *B60W 30/095* (2013.01); *B60W 10/04* (2013.01); *B60W 10/18* (2013.01); *B60W 30/09* (2013.01); *B60W 50/0097* (2013.01); *B60W 60/0027* (2020.02); *G08G 1/166* (2013.01); *B60W 60/0015* (2020.02); *B60W 2050/0052* (2013.01); *B60W 2520/06* (2013.01); *B60W 2520/10* (2013.01); *B60W 2554/00* (2020.02); *B60W 2554/804* (2020.02);
(Continued)

(58) Field of Classification Search
CPC .............. B60W 30/09; B60W 30/095; B60W 30/0953; B60W 30/0956; B60W 10/18; B60W 10/184–10/198; B60W 50/0097; B60W 2710/083; B60W 2710/0666; B60W 2710/105; G08G 1/166; B60T 7/22
See application file for complete search history.

(56) References Cited

U.S. PATENT DOCUMENTS 6,356,838 B1    3/2002    Paul
6,697,730 B2    2/2004    Dickerson
(Continued)

*Primary Examiner* — Spencer D Patton
(74) *Attorney, Agent, or Firm* — Quinn IP Law

(57) ABSTRACT

Presented are automated driving systems for intelligent vehicle control, methods for making/using such systems, and motor vehicles equipped with such automated driving systems. A method for executing an automated driving operation includes: determining path plan data for a subject motor vehicle, including current vehicle location and predicted route data; receiving, from a network of sensing devices, sensor data indicative of current object position and object dynamics of a target object; applying sensor fusion techniques to the received sensor data to determine a threat confidence value that is predictive of target object intrusion with respect to the vehicle's location and predicted route; determining if this threat confidence value is greater than a calibrated threshold value; and, responsive to the threat confidence value being greater than the calibrated threshold value, transmitting one or more command signals to one or more vehicle systems (e.g., powertrain, steering and/or brake system) to take preventive action.

19 Claims, 4 Drawing Sheets

(51) Int. Cl.
  *B60W 30/09*   (2012.01)
  *B60W 10/18*   (2012.01)
  *B60W 10/04*   (2006.01)
  *B60W 50/00*   (2006.01)
  *G08G 1/16*    (2006.01)

(52) U.S. Cl.
  CPC .............. *B60W 2710/0666* (2013.01); *B60W 2710/083* (2013.01); *B60W 2710/18* (2013.01); *B60W 2720/10* (2013.01)

(56) References Cited

U.S. PATENT DOCUMENTS

| | | |
|---|---|---|
| 7,840,427 B2 | 11/2010 | O'Sullivan |
| 8,170,739 B2 | 5/2012 | Lee |
| 8,199,046 B2 | 6/2012 | Nanami |
| 8,428,843 B2 | 4/2013 | Lee et al. |
| 8,612,139 B2 | 12/2013 | Wang et al. |
| 8,849,515 B2 | 9/2014 | Moshchuk et al. |
| 9,014,915 B2 | 4/2015 | Chatterjee et al. |
| 9,099,006 B2 | 8/2015 | Mudalige et al. |
| 9,229,453 B1 | 1/2016 | Lee |
| 9,283,967 B2 | 3/2016 | Lee |
| 9,487,212 B1 | 11/2016 | Adam et al. |
| 9,857,181 B2 | 1/2018 | Song et al. |
| 9,868,443 B2 | 1/2018 | Zeng et al. |
| 2008/0060613 A1* | 3/2008 | Bauerle ............... B60W 10/184 123/399 |
| 2009/0030885 A1 | 1/2009 | DePasquale et al. |
| 2010/0228415 A1 | 9/2010 | Paul |
| 2010/0253593 A1* | 10/2010 | Seder .................... G01S 13/931 345/7 |
| 2011/0059693 A1 | 3/2011 | O'Sullivan |
| 2011/0313880 A1 | 12/2011 | Paul et al. |
| 2012/0101713 A1 | 4/2012 | Moshchuk et al. |
| 2012/0239452 A1 | 9/2012 | Trivedi et al. |
| 2013/0032421 A1 | 2/2013 | Bonne et al. |
| 2013/0035821 A1 | 2/2013 | Bonne et al. |
| 2013/0054128 A1 | 2/2013 | Moshchuk et al. |
| 2013/0204676 A1 | 8/2013 | Hindi et al. |
| 2013/0219294 A1 | 8/2013 | Goldman-Shenhar |
| 2014/0011522 A1 | 1/2014 | Lin et al. |
| 2015/0353082 A1 | 12/2015 | Lee et al. |
| 2015/0353085 A1 | 12/2015 | Lee |
| 2016/0231124 A1 | 8/2016 | Nickolaou et al. |
| 2016/0320194 A1 | 11/2016 | Liu et al. |
| 2016/0320195 A1 | 11/2016 | Liu et al. |
| 2016/0320198 A1 | 11/2016 | Liu et al. |
| 2016/0321566 A1 | 11/2016 | Liu et al. |
| 2016/0321771 A1 | 11/2016 | Liu et al. |
| 2017/0021830 A1 | 1/2017 | Feldman et al. |
| 2019/0259282 A1* | 8/2019 | Ji ......................... G08G 1/0133 |

\* cited by examiner

AUTOMATED DRIVING SYSTEMS AND CONTROL LOGIC USING SENSOR FUSION FOR INTELLIGENT VEHICLE CONTROL

INTRODUCTION

The present disclosure relates generally to motor vehicles with automated driving capabilities. More specifically, aspects of this disclosure relate to adaptive cruise control systems using sensor fusion to enable intelligent vehicle headway control.

Current production motor vehicles, such as the modern-day automobile, are originally equipped with or retrofit to include a network of onboard electronic devices that provide automated driving capabilities that help to minimize driver effort. In automotive applications, for example, the most recognizable type of automated driving feature is the cruise control system, which allows a vehicle operator to set a particular vehicle speed and have the onboard vehicle computer system maintain that speed without the driver operating the accelerator or brake pedals. Next-generation Adaptive Cruise Control (ACC; also designated Autonomous Cruise Control) is a computer-automated vehicle control feature that regulates vehicle speed while concomitantly managing fore and aft spacing between the host vehicle and leading or trailing vehicles. Another type of automated driving feature is the Collision Avoidance System (CAS), which detects imminent collision conditions and provides a warning to the driver while also taking preventative action autonomously, e.g., by steering or braking, without driver input. Intelligent Parking Assist Systems (IPAS), Lane Monitoring and Automated Steering ("Auto Steer") Systems, and other Advanced Driver Assistance Systems (ADAS) and autonomous driving features are also available on many modern-day automobiles.

As vehicle sensing, communication, and control capabilities continue to improve, manufacturers will persist in offering more autonomous driving capabilities with the aspiration of eventually offering fully autonomous vehicles competent to operate among heterogeneous vehicle types in both urban and rural scenarios. Original equipment manufacturers (OEM) are moving towards vehicle-to-vehicle (V2V) "talking" cars with higher-level driving automation that employ autonomous systems to enable vehicle routing with steering, lane changing, scenario planning, etc. Automated route generation systems utilize vehicle state and dynamics sensors, neighboring vehicle and road condition data, and path prediction algorithms to provide path generation with automated lane center and lane change forecasting. Computer-assisted rerouting techniques offer predicted alternative travel routes that may be updated, for example, based on real-time and virtual vehicle data.

SUMMARY

Disclosed herein are automated driving systems and attendant control logic for intelligent vehicle operation, methods for constructing and methods for operating such systems, and motor vehicles employing sensor fusion to execute intelligent vehicle maneuvering. By way of example, there is presented a novel Full Speed Range Adaptive Cruise Control (FSRACC) system for controlling vehicle headway during a projected collision event within or in proximity to a predicted path of a host vehicle. In contrast to standard cruise control, an FSRACC system maintains a desired vehicle speed while making reactive speed adjustments to control headway spacing between a host vehicle and a vehicle forward of the host vehicle, including full-stop functionality. The FSRACC system utilizes sensor fusion to provision accurate targeting information and assess collision threat probability to help enable accurate headway control to a target in the host path. Sensor-fusion-based information is employed to evaluate threats based on behavioral prediction techniques utilizing prediction-based data (in conjunction with or in place of actual in-path target detection) for performing headway control. Such prediction-based control systems increase the amount of time available for the vehicle or driver to execute a braking maneuver, as well as increase the amount of distance for the vehicle or driver to maneuver around a collision. Using sensor-fusion-based impending collision estimation for performing headway control allows an ACC system to scrub more speed in cases where a collision occurs in the host vehicle's path, and allows a CAS to take more effective evasive action.

Also presented herein is a comprehensive sensor-fusion-based vehicle cut-in/cut-out prediction system that forecasts vehicles entering (cut in) or exiting (cut out) a predicted path of a host vehicle. The cut-in/cut-out prediction system employs behavioral prediction algorithms that use fused multi-sensor data to determine dynamic attributes of tracked objects in conjunction with ADAS feedback, e.g., to plan and govern a desired vehicle trajectory. This system enables rational calculation of cut-in/cut-out potential and consequent selection of tracked objects based on identified threat level. Attendant methods overlay track data onto an extended planned trajectory for a host vehicle, e.g., to allow motion tracking relative to a planned path, rather than relying solely on visible paint markers on the road. In so doing, the system is able to extend the effective range, accuracy, and time between detection and actual event of cut-in/cut-out by a target. Attendant methods select and classify objects of interest, e.g., based on threat assessment to the host, thus enabling increased vehicle control and reaction time for ADAS features. Cut-in/cut-out prediction methods and systems improve accuracy in driving scenarios on curved roads and at larger distances to a target object (e.g., 30-35+ meters). Vision-based techniques may supplement predictive analysis, e.g., to detect object position relative to lane markers. Predictive cut-in/cut-out techniques help to ensure top level ADAS performance, yielding consistent results, at large relative velocity values between a host vehicle and a tracked object.

Aspects of this disclosure are directed to sensor-fusion-based object intrusion estimation techniques and computer-executable algorithms for assisted and automated driving systems of motor vehicles. For instance, a method is presented for executing an automated driving operation of a motor vehicle. This representative method includes, in any order and in any combination with any of the above and below disclosed options and features: determining, via a resident vehicle controller of the motor vehicle, path plan data for the motor vehicle, the path plan data including, for example, a current vehicle location, attendant vehicle dynamics (e.g., heading, speed, acceleration or deceleration, etc.) and a predicted route; receiving, from a distributed network of onboard (and, optionally, off-board) sensing devices of the motor vehicle, sensor data indicative of a current object position and attendant object dynamics of a target object (e.g., one or more leading, trailing and/or passing motor vehicles); applying a sensor fusion module (e.g., a computational framework for the aggregation, analysis and alliance of data originating from heterogeneous or homogeneous sensing devices) to the received sensor data to determine a threat confidence value predictive of intrusion of the target object with respect to the subject motor vehicle's location and predicted route; determining, via the resident vehicle controller, if the threat confidence value is greater than a first calibrated threshold value; and, responsive to the threat confidence value being greater than the first calibrated threshold value, the resident vehicle controller transmitting a first command signal to a first vehicle dynamics system to take a first preventive action.

For any of the disclosed systems, methods, and vehicles, the resident vehicle controller may also: determine, in response to the threat confidence value not being greater than the first calibrated threshold value, if the threat confidence value is greater than a second calibrated threshold value, which is less than the first calibrated threshold value; and, responsive to the threat confidence value being greater than the second calibrated threshold value, transmit a second command signal to a second vehicle dynamics system to take a second preventive action. For at least some implementations, the first command signal is a braking command (e.g., onset, pressure and duration), the first vehicle dynamics system is the vehicle's brake system, and the first preventive action includes a braking maneuver (e.g., override throttle and initiate vehicle braking). Likewise, the second command signal may be a speed scrubbing command (e.g., disengage transmission output shaft), the second vehicle dynamics system is the vehicle's powertrain system, and the second preventive action includes a torque reduction action (e.g., override throttle and discontinue torque transmission to vehicle wheels).

For any of the disclosed systems, methods, and vehicles, sensor fusion may be applied to received sensor data to determine a predicted intrusion location (e.g., headway distance) of the target object with respect to the predicted route of the motor vehicle. Iterative prediction and correction may be executed to determine a refined variation of this predicted intrusion location of the target object. The iterative prediction and correction protocol may also generate a relative velocity between the motor vehicle and the target object. From the foregoing data, the method may update the threat confidence value based on the refined predicted intrusion location, and contemporaneously determine if this refined variation of the threat confidence value is greater than the first calibrated threshold value. In this instance, the first command signal is transmitted to the first vehicle dynamics system to initiate the first preventive action in response to the refined threat confidence value being greater than the first calibrated threshold value. In the same vein, the resident vehicle controller may determine whether or not the refined threat confidence value is greater than the second calibrated threshold value. In this instance, the second command signal is transmitted to the second vehicle dynamics system to commence the second preventive action in response to the refined threat confidence value being greater than the second calibrated threshold value.

For any of the disclosed systems, methods, and vehicles, each of the onboard (and/or offboard) sensing devices may generate their respective portion of the sensor data with respect to a respective coordinate frame. Received sensor data may be conditioned to interrelate the respective coordinate frames of the sensing devices with a common coordinate frame. As another option, a data association protocol may be executed to classify each respective portion of received sensor data to correlate related ones of these respective portions of the sensor data. Once data conditioning and association is complete, the resident vehicle controller may fuse the sensor data to determine a preliminary fused cut-in/cut-out prediction value, process this preliminary fused cut-in/cut-out prediction value with a correction Kalman filter, e.g., to remediate sensor gain and sensor error, and process the filtered cut-in/cut-out prediction value with a prediction Kalman filter, e.g., to refine position and velocity values of the target object.

For any of the disclosed systems, methods, and vehicles, the resident vehicle controller may receive, from the distributed network of onboard/off-board sensing devices, sensor data indicative of a current object position and attendant object dynamics of a second target object. Resident vehicle controller may receive behavioral data for both target objects under observation, and applying sensor fusion to the received sensor data and behavioral data to estimate a collision (e.g., likelihood of occurrence, estimated location, estimated time of occurrence, etc.) between the two target objects within or proximate to the vehicle location and predicted route of the motor vehicle.

Other aspects of the present disclosure are directed to motor vehicles employing sensor-fusion-based object intrusion estimation techniques for executing assisted or automated driving operations. As used herein, the term "motor vehicle" may include any relevant vehicle platform, such as passenger vehicles (internal combustion engine, hybrid, full electric, fuel cell, etc.), commercial vehicles, industrial vehicles, tracked vehicles, off-road and all-terrain vehicles (ATV), farm equipment, boats, airplanes, etc. In addition, the terms "assisted" and "automated" and "autonomous" may be used with respect to any relevant vehicle platform that may be classified as a Society of Automotive Engineers (SAE) Level 2, 3, 4 or 5 vehicle. SAE Level 0, for example, is generally typified as "unassisted" driving that allows for vehicle-generated warnings with momentary intervention, but otherwise relies solely on human control. By comparison, SAE Level 3 allows for unassisted, partially assisted, and fully assisted driving with sufficient vehicle automation for full vehicle control (steering, speed, acceleration/deceleration, etc.), while obliging driver intervention within a calibrated timeframe. At the upper end of the spectrum is Level 5 automation that altogether eliminates human intervention (e.g., no steering wheel, gas pedal, or shift knob).

In an example, a motor vehicle is presented that includes a vehicle body with a vehicle powertrain (e.g., engine/motor, transmission, final drive, powertrain control module (PCM), etc.), a vehicle brake system (e.g., disk/drum, hydraulics, brake system control module (BSCM), etc.), and a network of onboard sensing devices (e.g., radar, LIDAR, infrared, camera, GPS, etc.), all of which are mounted to the vehicle body. A resident (or remote) vehicle controller is communicatively connected to the vehicle powertrain, brake system, and various sensing devices. The resident vehicle controller is programmed to calculate, call-up, estimate, or retrieve (collectively "determine") path plan data indicative of the vehicle's current location and a predicted route for the motor vehicle. In addition, the resident vehicle controller retrieves, accesses or collects (collectively "receive"), from various sensing devices, sensor data indicative of a current object position and related object dynamics of a target object. A sensor fusion module is applied to this sensor data to determine a threat confidence value that is predictive of intrusion of the target object with respect to the vehicle's location and predicted route. If it is determined that the threat confidence value is greater than a first calibrated threshold value, the vehicle controller will responsively transmit a braking command signal to the vehicle braking system to execute a prescribed braking maneuver. If, however, the threat confidence value is not greater than the first calibrated threshold value, the resident vehicle controller will determine if the threat confidence value is greater than a second calibrated threshold value that is less than the first calibrated threshold value. Responsive to a determination that the threat confidence value is greater than the second calibrated threshold value, a speed scrubbing command signal is transmitted to the vehicle powertrain to execute a torque reduction action.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

Figure 1:
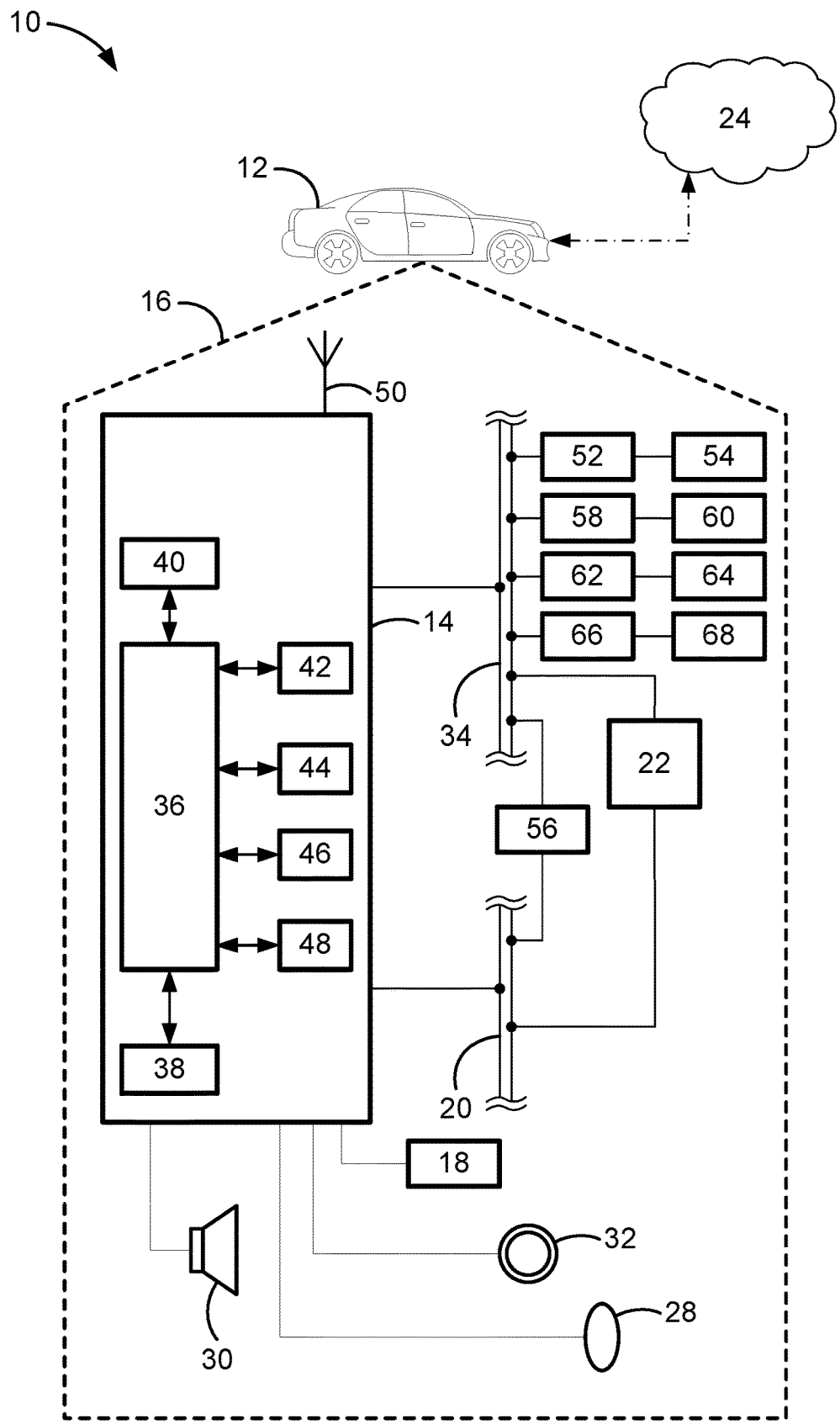
FIG. 1 is a schematic illustration of a representative motor vehicle with a network of in-vehicle controllers, sensing devices, and communication devices for executing automated and/or autonomous driving operations in accordance with aspects of the present disclosure.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

This disclosure is susceptible of embodiment in many different forms. There are shown in the drawings and will herein be described in detail representative embodiments of the disclosure with the understanding that these illustrated examples are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including" and "comprising" and "having" shall each mean "including without limitation." Moreover, words of approximation, such as "about," "almost," "substantially," "approximately," and the like, may be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a normal driving surface, for example.

Referring now to the drawings, wherein like reference numbers refer to like features throughout the several views, there is shown in FIG. 1 a representative automobile, which is designated generally at 10 and portrayed herein for purposes of discussion as a sedan-style passenger vehicle. Packaged on a vehicle body 12 of the automobile 10, e.g., distributed throughout the different vehicle compartments, is an onboard network of electronic devices for executing one or more assisted or automated driving operations. The illustrated automobile 10—also referred to herein as "motor vehicle" or "vehicle" for short—is merely an exemplary application with which aspects and features of this disclosure may be practiced. In the same vein, implementation of the present concepts for the specific ADAS architectures and functions discussed below should also be appreciated as an exemplary application of the novel features disclosed herein. As such, it will be understood that aspects and features of this disclosure may be applied to other system architectures, utilized for other automated driving operations, and implemented for any logically relevant type of motor vehicle. Moreover, only select components of the vehicle 10 have been shown and will be described in additional detail herein. Nevertheless, the motor vehicles and network architectures discussed herein may include numerous additional and alternative features, and other available peripheral components, for example, for carrying out the various methods and functions of this disclosure. Lastly, the drawings presented herein are not necessarily to scale and are provided purely for instructional purposes. Thus, the specific and relative dimensions shown in the drawings are not to be construed as limiting.

The representative vehicle 10 of FIG. 1 is originally equipped with a vehicle telecommunication and information ("telematics") unit 14 that wirelessly communicates (e.g., via cell towers, base stations and/or mobile switching centers (MSCs), etc.) with a remotely located or "off-board" cloud computing system 24. Some of the other vehicle hardware components 16 shown generally in FIG. 1 include, as non-limiting examples, a display device 18, a microphone 28, a speaker 30, and input controls 32 (e.g., buttons, knobs, switches, touchpads, keyboards, touchscreens, etc.). Generally, these hardware components 16 enable a user to communicate with the telematics unit 14 and other systems and system components within the vehicle 10. Microphone 28 provides a vehicle occupant with means to input verbal or other auditory commands; the vehicle 10 may be equipped with an embedded voice-processing unit utilizing human/machine (HMI) technology. Conversely, speaker 30 provides audible output to a vehicle occupant and may be either a stand-alone speaker dedicated for use with the telematics unit 14 or may be part of audio system 22. The audio system 22 is operatively connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switch, internal/external parallel/serial communication bus, a local area network (LAN) interface, a controller area network (CAN), a media-oriented system transfer (MOST), a local interconnection network (LIN) interface, and the like. Other appropriate communication interfaces may include those that conform with ISO, SAE, and IEEE standards and specifications. The network connection interface 34 enables the vehicle hardware 16 to send and receive signals with each other and with various systems and subsystems both within or "resident" to the vehicle body 12 and outside or "remote" from the vehicle body 12. This allows the vehicle 10 to perform various vehicle functions, such as controlling vehicle steering, governing operation of the vehicle's transmission, controlling engine throttle, engaging/disengaging the brake system, and other automated driving functions. For instance, telematics unit 14 receives and/or transmits data to/from an ADAS electronic control unit (ECU) 52, an engine control module (ECM) 54, a powertrain control module (PCM) 56, sensor interface module(s) 58, a brake system control module (BSCM) 60, and assorted other vehicle ECUs, such as a transmission control module (TCM), a climate control module (CCM), etc.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to one or more electronic memory devices 38, each of which may take on the form of a CD-ROM, magnetic disk, IC device, semiconductor memory (e.g., various types of RAM or ROM), etc., and a real-time clock (RTC) 42. Long-range vehicle communication capabilities with remote, off-board networked devices may be provided via one or more or all of a cellular chipset/component, a navigation and location chipset/component (e.g., global positioning system (GPS)), or a wireless modem, all of which are collectively represented at 44. Close-range wireless connectivity may be provided via a short-range wireless communication device 46 (e.g., a Bluetooth® unit or near field communications (NFC) transceiver), a dedicated short-range communications (DSRC) component 48, and/or a dual antenna 50. It should be understood that the vehicle 10 may be implemented without one or more of the above listed components, or may include additional components and functionality as desired for a particular end use. The various communications devices described above may be configured to exchange data as part of a periodic broadcast in a V2V communication system or a vehicle-to-everything (V2X) communication system, e.g., Vehicle-to-Infrastructure (V2I), Vehicle-to-Pedestrian (V2P), and/or Vehicle-to-Device (V2D).

CPU 36 receives data from one or more sensing devices that use, for example, photo detection, radar, laser, ultrasonic, optical, infrared, or other suitable technology for object detection, including short range communications technologies such as DSRC or Ultra-Wide Band (UWB). In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion and analysis hardware and software for processing raw sensor data. Digital camera 62 may use a charge coupled device (CCD) sensor or other suitable optical sensor to generate images indicating a field-of-view of the vehicle 10, and may be configured for continuous image generation, e.g., at least about 35 images generated per second. By way of comparison, range sensor 64 may emit and detect reflected radio, electromagnetic, or light-based waves (e.g., radar, EM inductive, Light Detection and Ranging (LIDAR), etc.) to detect, for example, presence, geometric dimensions, and/or proximity of an object. Vehicle speed sensor 66 may take on various forms, including wheel speed sensors that measure wheel speeds, which are then used to determine real-time vehicle speed. In addition, the vehicle dynamics sensor 68 may be in the nature of a single-axis or a triple-axis accelerometer, an angular rate sensor, an inclinometer, etc., for detecting longitudinal and lateral acceleration, yaw, roll, and/or pitch rates, or other dynamics related parameter. Using data from the sensing devices 62, 64, 66, 68, the CPU 36 identifies objects within a detectable range of the vehicle 10, and determines attributes of the target object, such as size, relative position, angle of approach, relative speed, etc.

These sensors are distributed throughout the vehicle 10 in operatively unobstructed positions relative to respective views fore or aft or on port or starboard sides of the vehicle. Each sensor generates electrical signals indicative of a characteristic or condition of a targeted object, generally as an estimate with a corresponding standard deviation. While the operating characteristics of these sensors are generally complementary, some are more reliable in estimating certain parameters than others. Most sensors have different operating ranges and areas of coverage, and are capable of detecting different parameters within their operating range. For instance, a radar-based sensor may estimate range, range rate, and azimuth location of an object, but may not be robust in estimating the extent of a detected object. Cameras with optics processing, on the other hand, may be more robust in estimating a shape and azimuth position of an object, but may be less efficient at estimating the range and range rate of the object. A scanning-type LIDAR-based sensor may perform efficiently and accurately with respect to estimating range and azimuth position, but may be unable to accurately estimate range rate and, thus, may not be accurate with respect to new object acquisition/recognition. Ultrasonic sensors, by comparison, are capable of estimating range but are generally unable to accurately estimate range rate and azimuth position. Further, the performance of many sensor technologies may be affected by differing environmental conditions. Consequently, sensors generally present parametric variances whose operative overlap offer opportunities for sensory fusion.

Figure 2:
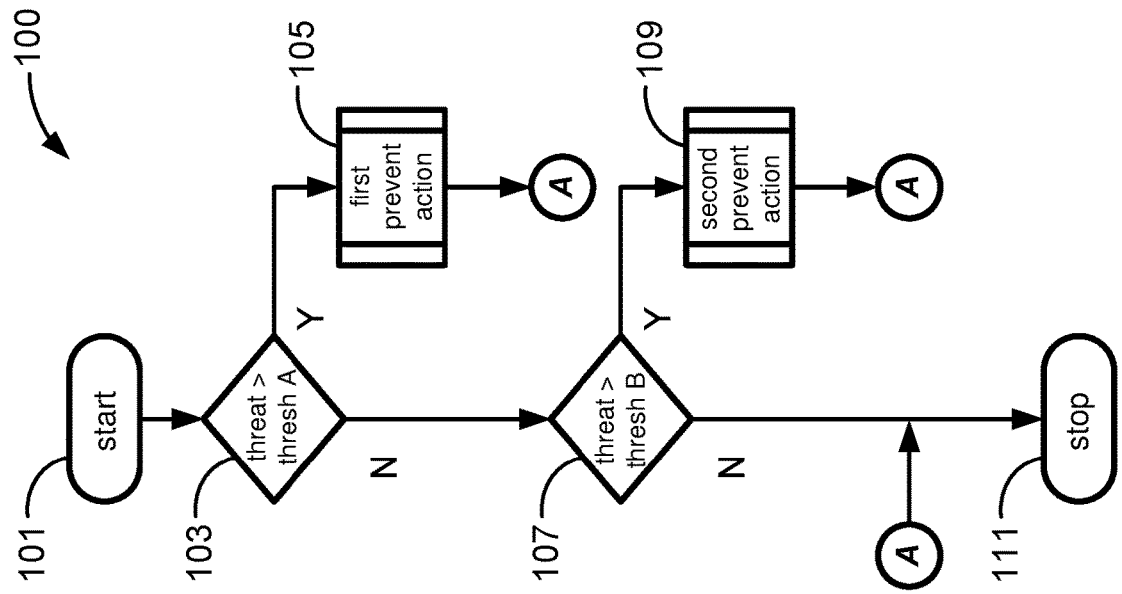
FIG. 2 is a flowchart for a sensor-fusion-based behavioral prediction and threat assessment protocol that may correspond to instructions executed by onboard or remote control-logic circuitry, programmable electronic control unit, or other computer-based device or network of devices in accord with aspects of the disclosed concepts.

With reference now to the flow chart of FIG. 2, an improved method or control strategy for sensor-fusion-based behavioral prediction and threat assessment is generally described at 100 in accordance with aspects of the present disclosure. Some or all of the operations illustrated in FIG. 2 and described in further detail below may be representative of an algorithm that corresponds to processor-executable instructions that may be stored, for example, in main or auxiliary or remote memory, and executed, for example, by an onboard or remote controller, processing unit, control logic circuit, or other module or device, to perform any or all of the above or below described functions associated with the disclosed concepts. It should be recognized that the order of execution of the illustrated operation blocks may be changed, additional blocks may be added, and some of the blocks described may be modified, combined, or eliminated.

Method 100 begins at terminal block 101 with processor-executable instructions for a programmable controller or control module or similarly suitable processor to call up an initialization procedure for a protocol to govern operation of an automated driving system that controls vehicle headway during a projected collision event within or in proximity to a predicted path of a subject (host) vehicle. This routine may be executed in real-time, continuously, systematically, sporadically and/or at regular intervals, for example, each 100 milliseconds, etc., during ongoing vehicle operation. With continuing reference to the architecture of FIG. 1 as a representative implementation of the methodology set forth in FIG. 2, the initialization procedure at block 101 may be initiated each time the subject vehicle 10 encounters another motor vehicle while a resident FSRACC system is active. For instance, a driver, the resident CPU 36, and/or a dedicated ADAS ECU 52 may activate FSRACC to maintain a set speed as the vehicle 10 is driving on a multi-lane highway. During active use of FSRACC, the vehicle 10 may encounter one or more passing vehicles, e.g., a first target vehicle travelling in a first (left) adjacent lane at a first speed to pass at a first time, and a second target vehicle travelling in a second (right) adjacent lane at a second speed to pass at a second time. Using sensor feedback from any combination of the various sensing devices of FIG. 1 described above, the vehicle CPU 36 performs new object acquisition, completes object characterization (e.g., identifying respective type, width, length ($O_T$, $O_W$ and $O_L$), etc.), tracks object dynamics (e.g., respective lateral and longitudinal velocity ($V_X$ and $V_Y$), lateral and longitudinal acceleration ($A_X$ and $A_Y$), etc.), and conducts object disposition (e.g., relative position, lane offset, current lane width, relative lane, etc.).

As will be explained in extensive detail below, a resident (or remote) vehicle controller will fuse the foregoing sensor-based data, and analyze the fused data in conjunction with behavioral data for each target object, to calculate whether or not it is statistically probable that each target vehicle will enter (cut in) or exit (cut out) a predicted path of the vehicle 10. Concomitantly, the vehicle controller will assess whether or not it is statistically probable that these two target vehicles will collide in a manner that will obstruct, in whole or in part, the predicted path of the vehicle 10. Determination of a threat may be based on calculation of a probability of overall incursion of a given target vehicle into an "intrusion box" that is configured to bound the host vehicle 10, yet is transposed to a relative location adjacent the target object along the planned path of the host vehicle. When a high-confidence prediction of an impending collision is made, a virtual "collision target" indicative of an estimated locus of the collision may be generated and fed to headway control logic such that remediating action may be taken. For instance, CPU 36 may responsively command ECM 54 to reduce engine output, and contemporaneously command PCM 56 to cut torque transmission to the wheel corner assemblies, thereby allowing for smooth torque cutout. Concurrent with the aforementioned speed scrubbing, the CPU 36 may command BSCM 60 to apply a calculated brake pressure that is calibrated to ensure the vehicle 10 will stop or be able to take evasive action before the vehicle 10 overtakes the virtual collision target. It should be recognized that the disclosed methodologies are not per se limited to FSRACC applications, and could be applied to other ADAS systems as well as SAE Level 2/3/4/5 automated driving systems.

At decision block 103, the method 100 of FIG. 2 determines if an estimated threat confidence value is greater than a first (primary) calibrated threshold value. This threat confidence value is predictive of an intrusion of a target object (e.g., a passing motor vehicle) in a manner that will at least partially obstruct a predicted route of the subject vehicle as it relates to a current (real-time) location of the subject vehicle. Intrusion prediction is generally explained above and will be described in further detail below during the discussion of method 400 of FIG. 5. Responsive to a determination that the threat confidence value is in fact greater than the first (primary) calibrated threshold value (block 103=YES), the method 100 proceeds to predefined process block 105 with instructions for the vehicle controller to transmit a first command signal to a first vehicle dynamics system to take a first (primary) preventive action. By way of example, and not limitation, CPU 36 may transmit a braking command signal or signals, e.g., with a time of onset, a calibrated hydraulic pressure value, and a duration time period, to the vehicle brake system to execute a braking maneuver, e.g., to come to a full stop or to reduce speed to a calculated value that will readily allow an evasive steering maneuver. Predefined process block 105 of FIG. 2 is described in further detail below with respect to the method 200 of FIG. 3.

If a determination is made that the threat confidence value is not greater than the first (primary) calibrated threshold value (block 103=NO), the method 100 proceeds to decision block 107 with instructions for the vehicle controller to determine if the threat confidence value is greater than a second (ancillary) calibrated threshold value. This ancillary calibrated threshold value, which may be denoted $TV_2$, is less than the primary calibrated threshold value, which may be denoted $TV_1$ (e.g., $TV_1$=95%; $TV_2$=75%). Responsive to a determination that the threat confidence value is greater than the second (ancillary) calibrated threshold value (block 107=YES), the method 100 proceeds to predefined process block 109 with instructions for the vehicle controller to transmit a second command signal to a second vehicle dynamics system to take a second (ancillary) preventive action. By way of non-limiting example, CPU 36 may transmit a speed scrubbing command signal or signals to PCM 56, which will relay corresponding commands, e.g., to a torque converter to disengage the engine from the transmission, to a disconnect clutch mechanism to disengage a tractive motor (e.g., in a hybrid, fuel cell or all-electric vehicle configuration), and/or to a power transmission to disengage the transmission's output shaft, in order to execute a torque reduction action, e.g., overriding engine throttle and discontinuing torque transmission to vehicle wheels.

If the threat confidence value is not greater than the second (ancillary) calibrated threshold value (block 107=NO), the method 100 may proceed to terminal block 111 and terminate, or may loop back to terminal block 101 and run in a continuous loop. It is envisioned that the predefined process blocks illustrated at blocks 105 and 109 may each be supplemented with or supplanted by other automated vehicle operations devised to mitigate a collision event, including automated lane change or other evasive steering maneuver, audible/visual driver warning, vehicle acceleration or deceleration, and other collision avoidance maneuvers. By differentiating between the tiered confidence thresholds to determine which remediating course of action to take, the methodology 100 of FIG. 2 helps to ensure separation between primary preventive actions (vehicle braking and/or evasive steering) and secondary preventive actions (speed scrubbing and/or driver warning). Predefined process block 109 of FIG. 2 is described in further detail below with respect to the method 300 of FIG. 4.

Figure 3:
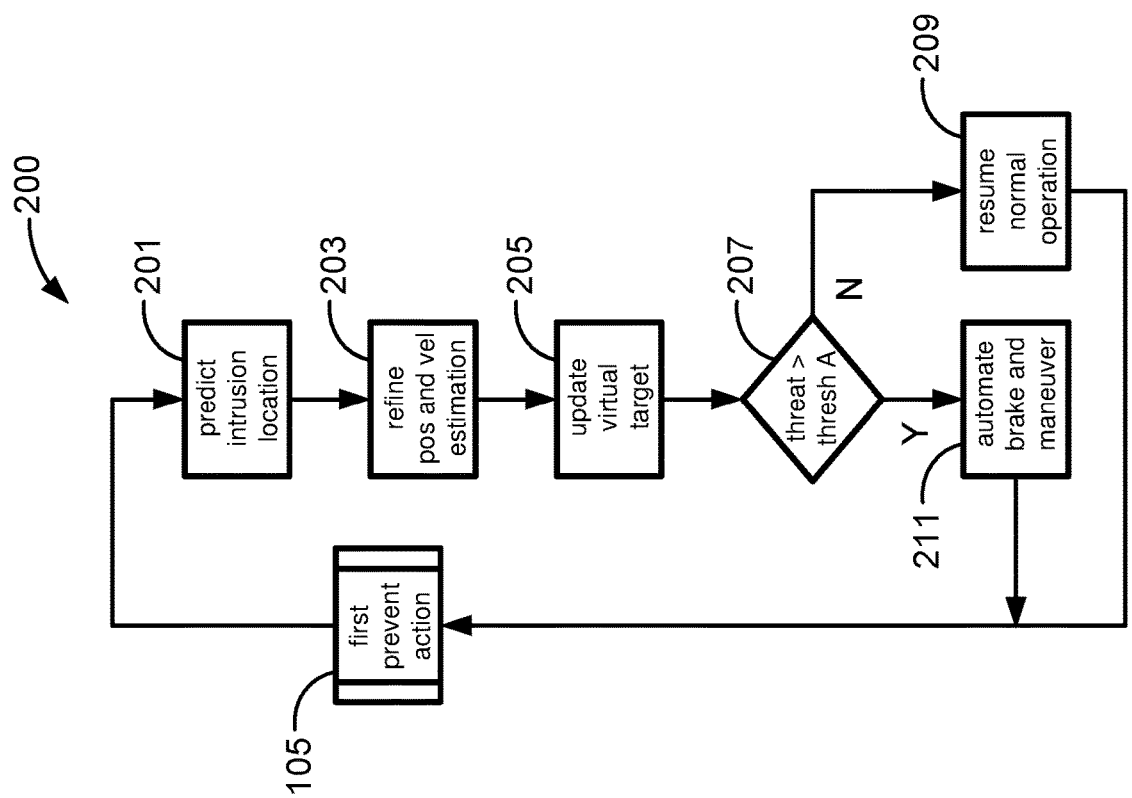
FIG. 3 is a flowchart for an automated vehicle braking maneuver protocol that may correspond to instructions executed by onboard or remote control-logic circuitry, programmable electronic control unit, or other computer-based device or network of devices in accord with aspects of the disclosed concepts.

With reference now to the flow chart of FIG. 3, an improved method or control strategy for executing a primary preventive action, namely the automated vehicle braking maneuver described above with respect to predefined process block 105, is generally described at 200 in accordance with aspects of the present disclosure. Some or all of the operations illustrated in FIG. 3 and described in further detail below may be representative of an algorithm that corresponds to processor-executable instructions that may be stored, for example, in main or auxiliary or remote memory, and executed, for example, by an onboard or remote controller, processing unit, control logic circuit, or other module or device, to perform any or all of the above or below described functions associated with the disclosed concepts. It should be recognized that the order of execution of the illustrated operation blocks may be changed, additional blocks may be added, and some of the blocks described may be modified, combined, or eliminated.

Upon initialization of predefined process block 105, e.g., as an automated response to a positive determination at decision block 103, the method 200 of FIG. 3 proceeds to process block 201 with processor-executable instructions for a resident or remote vehicle controller to apply a sensor fusion module to aggregated raw sensor data to thereby determine a predicted intrusion location of a target object with respect to the predicted route and location of a host vehicle. As a non-limiting example, CPU 36 of motor vehicle 10 may apply sensor fusion to target dynamics data—velocity, acceleration, trajectory, relative position, etc.—and target behavioral data—sensed erratic movement, speeding, swerving, etc.—to derive an estimated location for predicted path intrusion and in-path collision. After establishing an initial prediction for the locus of the collision, the method 200 proceeds to process block 203 to execute an iterative prediction and correction protocol to determine a relative velocity and a refined variation of the target object's predicted intrusion location. For instance, CPU 36 may perform iterative prediction and correction to refine position and relative velocity estimation of the in-path incursion and collision relative to the host vehicle. After a preliminary prediction is generated with a preliminary confidence level (e.g., approximately 15-20%), the method 200 will iterate through the sensor fusion sequence, over a designated window of time, to increase the level of confidence. As the relative distance between two tracked objects continues to diminish, the sensor fusion sequence will be able to more accurately predict the characteristics of an impending collision, including collision time, locus, distance and time for host vehicle to overtake predicated collision, etc. This iterative process may continue until an optimized or peak confidence level value is reached and/or the confidence level no longer changes more than a predetermined amount (e.g., a buffer range of +/−2%).

After iterating through the sensor fusion protocol at process block 203, the method 200 continues to process block 205 to determine an updated version of the virtual collision target and corresponding threat confidence value based on the refined estimations conducted at block 203. The FSRACC system of vehicle 10, for example, may replace or otherwise update the virtual "high confidence" target, including any corresponding characteristics thereof, with the newly generated fused dynamic properties. In a more specific instance, during target tracking, the fusion system iterates through a Kalman filter loop to dynamically update one or more or all of the attributes associated with the virtual target (e.g., relative position (x,y), relative velocity (Vx, Vy), relative acceleration (Ax, Ay), confidence level, etc.) in response to dynamic changes in target behavior.

With continuing reference to FIG. 3, the method 200 determines, at decision block 207, if the refined and updated threat confidence value is greater than the first (primary) calibrated threshold value. If not (block 207=NO), method 200 proceeds to process block 209 to resume normal vehicle operation without taking evasive or preventive action; at this time, method 100 of FIG. 2 may forego predefined process block 105 and proceed to process block 107 or terminal block 111. Optionally, process block 209 may further require the method 200 nullify and delete the virtual collision target. On the other hand, if a determination is made that the updated threat confidence value is in fact greater than the primary threshold value (block 207=YES), the method 200 will proceed to process block 211 and execute the primary preventive action described above with respect to process block 105 of FIG. 2, namely transmitting a predetermined command signal to a designated vehicle dynamics system to take a predetermined preventive action. Process block 211 may further require feeding the virtual collision target to a collision imminent remediation algorithm that will then determine the proper course of action to take (e.g., depending on delta velocity, system will automate braking operation and/or evasive steering maneuver to either completely avoid collision or, at the minimum, decrease severity of impact).

Figure 4:
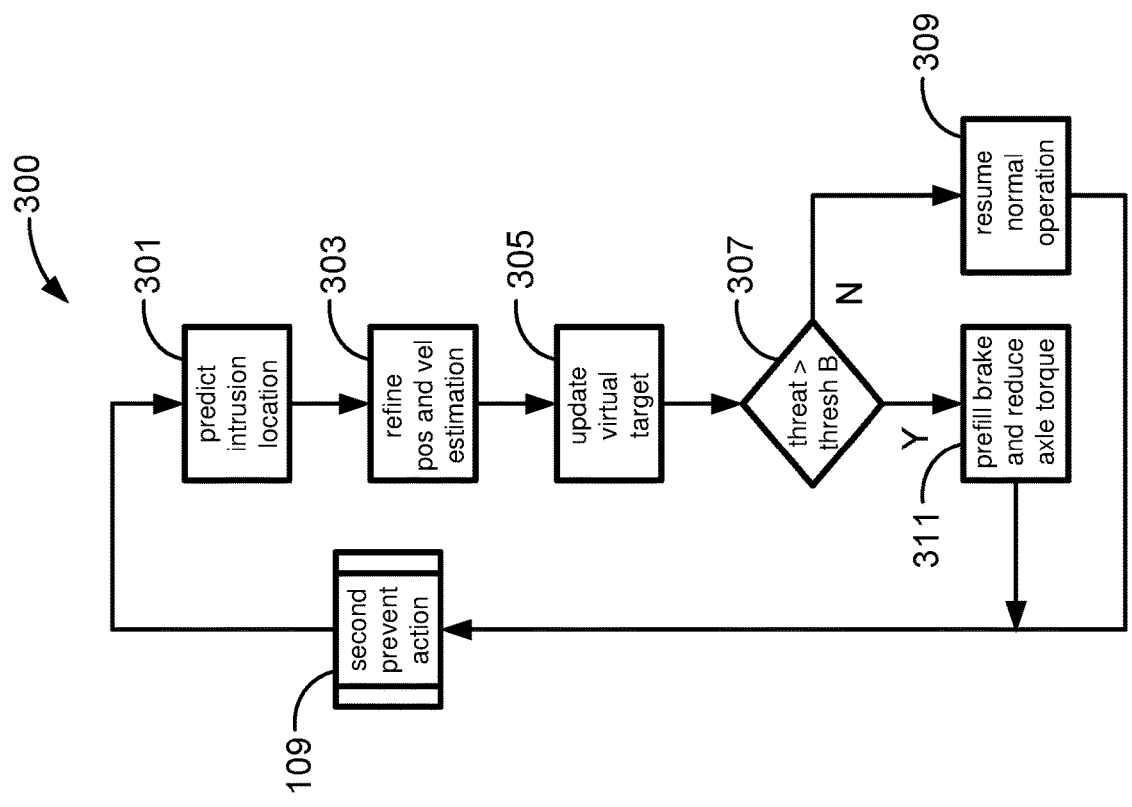
FIG. 4 is a flowchart for an automated vehicle speed scrubbing protocol that may correspond to instructions executed by onboard or remote control-logic circuitry, programmable electronic control unit, or other computer-based device or network of devices in accord with aspects of the disclosed concepts.

With reference now to the flow chart of FIG. 4, an improved method or control strategy for executing a secondary preventive action, namely the automated speed scrubbing protocol described above with respect to predefined process block 109 of FIG. 2, is generally described at 300 in accordance with aspects of the present disclosure. Like the methods 100 and 200 described above, some or all of the operations illustrated in FIG. 4 may be representative of an algorithm that corresponds to processor-executable instructions that may be stored, for example, in a memory device and executed by a suitable processing device to perform any or all of the functions associated with the disclosed concepts. It should be recognized that the order of execution of the illustrated operation blocks may be changed, additional blocks may be added, and some of the blocks described may be modified, combined, or eliminated. For instance, the methods 100, 200, 300 and 400 of FIGS. 2-5 may be combined into a single control logic protocol.

Upon initialization of predefined process block 109, e.g., as an automated response to a positive determination at decision block 107 of FIG. 2, the method 300 of FIG. 4 proceeds to process block 301 with processor-executable instructions for a resident or remote vehicle controller to apply a sensor fusion module to aggregated raw sensor data to thereby determine a predicted intrusion location of a target object with respect to the predicted route and location of a host vehicle. Once an initial prediction for the locus of the collision has been established, method 300 proceeds to process block 303 to execute an iterative prediction and correction protocol to determine a relative velocity and a refined variation of the target object's predicted intrusion location. Method 300 thereafter continues to process block 305 to determine an updated version of the virtual collision target and corresponding threat confidence value based on the refined estimations conducted at block 203. For at least some implementations, process blocks 301, 303 and 305 of FIG. 4 may be generally identical to process blocks 201, 203 and 205, respectively, of FIG. 3.

With continuing reference to FIG. 4, the method 300 determines, at decision block 307, if the refined and updated threat confidence value is greater than the second (ancillary) calibrated threshold value. If it is not (block 307=NO), method 300 proceeds to process block 309 to resume normal vehicle operation (e.g., maintaining FSRACC default operation) without taking evasive or preventive action as it is more likely than not there will not be a collision obstructing the predicted path of the host vehicle. At this time, method 100 of FIG. 1 may forego predefined process blocks 105 and 109 and proceed to terminal block 111. Similar to process block 209 of FIG. 3, process block 309 of FIG. 4 may further require destroying the virtual collision target. However, if it is determined that the updated threat confidence value is greater than the ancillary threshold value (block 307=YES), the method 300 proceeds to process block 311 and executes the secondary preventive action described above with respect to process block 109 of FIG. 2. Process block 311 may further require feeding the virtual collision target to a collision likely remediation algorithm that will then determine the proper course of action to take (e.g., when and for how long will speed scrubbing take place, and whether or not to prefill brakes to eventually execute a braking maneuver).

Figure 5:
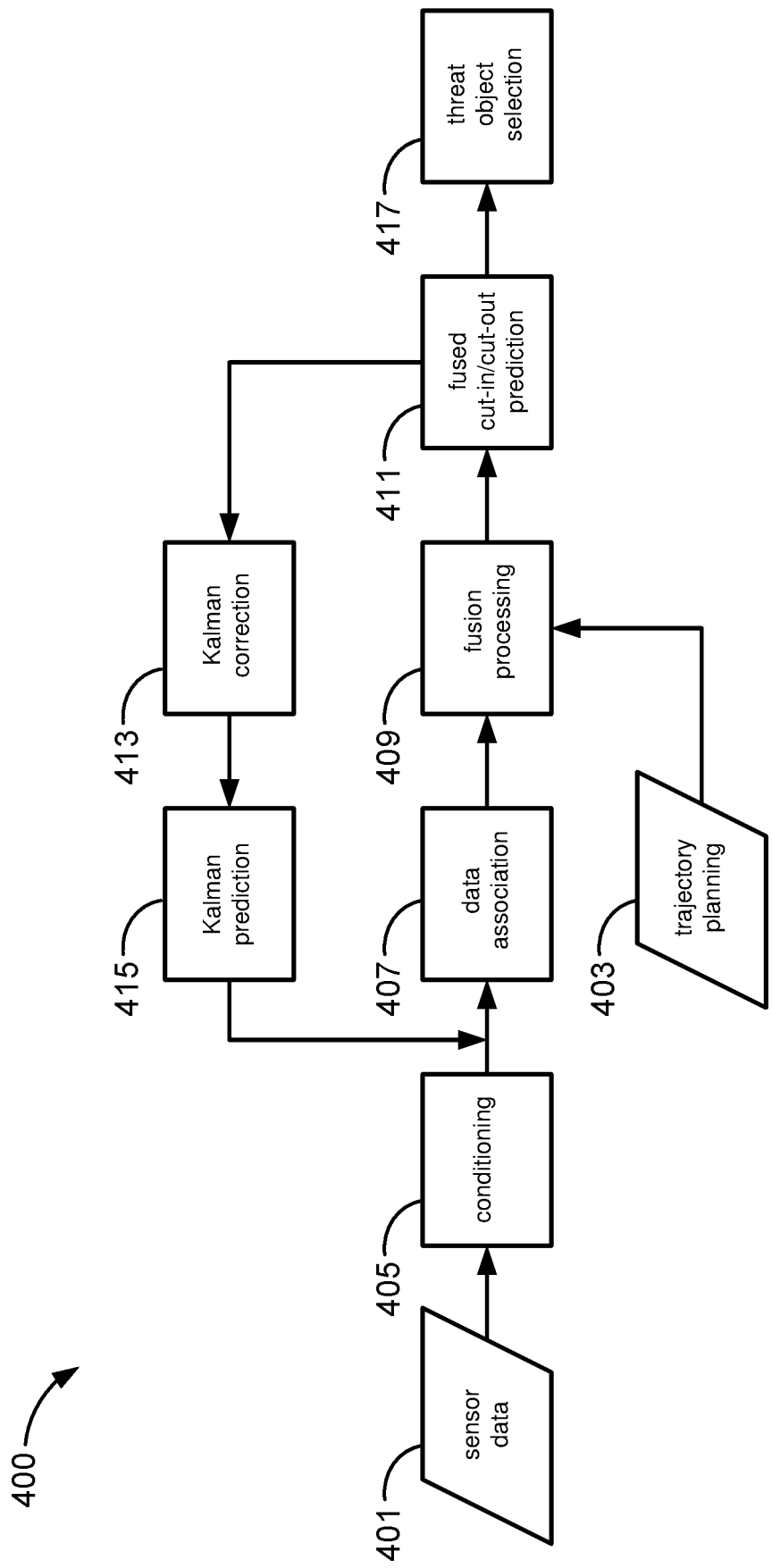
FIG. 5 is a flowchart for an automated sensor-fusion-based vehicle cut-in/cut-out prediction protocol that may correspond to instructions executed by onboard or remote control-logic circuitry, programmable electronic control unit, or other computer-based device or network of devices in accord with aspects of the disclosed concepts.

With reference now to the flow chart of FIG. 5, an improved method or control strategy for automated sensor-fusion-based vehicle cut-in/cut-out prediction is generally described at 400 in accordance with aspects of the present disclosure. Some or all of the operations illustrated in FIG. 5 and described in further detail below may be representative of an algorithm that corresponds to processor-executable instructions that may be stored, for example, in main or auxiliary or remote memory, and executed, for example, by an onboard or remote controller, processing unit, control logic circuit, or other module or device, to perform any or all of the above or below described functions associated with the disclosed concepts. It should be recognized that the order of execution of the illustrated operation blocks may be changed, additional blocks may be added, and some of the blocks described may be modified, combined, or eliminated.

Method 400 begins at input/output block 401 with a resident/remote vehicle controller receiving raw sensor data and, optionally, retrieving other related information necessary to execute an automated driving operation. Sensor data may include any of the data enumerated above, e.g., as it relates to the operating conditions and dynamics of the host vehicle and each target object under investigation, such as respective position, velocity, acceleration, type, size, behavior and other object dynamics and characteristic information. At the same time, the method 400 may implement processor-executable instructions at input/output block 403 for a vehicle controller to calculate, retrieve or otherwise determine path plan data for the subject vehicle, including at least a current (real-time) location and a predicted route for the vehicle. At process block 405, the method conditions the data received from the distributed network of in-vehicle sensors. For instance, each onboard sensing device 62, 64, 66, 68 of FIG. 1 initially generates a discrete portion of the batch sensor data received by CPU 36 through sensor interface module 58. Each sensor may generate its respective portion with respect to a distinct coordinate frame; with this construct, the CPU 36 may condition any received sensor data to interrelate the various coordinate frames so as to overlap with a single, common "reference" coordinate frame. Data conditioning may further comprise interrelating received sensor data to ensure overlap with a single, common "reference" timeframe, set of standard measurements, etc.

Once the received sensor data is sufficiently conditioned to ensure alignment across related measurements, method 400 continues to process block 407 to execute a data association protocol that will classify each respective portion of sensor data. When all data in a particular data set are properly classified, the vehicle controller may then correlate related portions or sensor data based on any complementary classifications. For instance, CPU 36 may characterize signals received from digital cameras 62 as including object acquisition data, object type data, object size data and relative location data, and characterize signals received from range sensor 64 as including object acquisition data, object speed and relative speed data, object acceleration and relative acceleration data, and relative location data. The data from both the digital cameras 62 and the range sensor 64 have already been conditioned to ensure spatial, temporal, and metric overlap (block 405); the CPU 36 will concomitantly correlate acquisition data and relative location data received from the digital camera 62 with respective acquisition data and relative location data received from the range sensor 64.

With continuing reference to FIG. 5, method 400 continues to process block 409 to execute a sensor fusion procedure of the conditioned and classified data along with the path plan data of the subject vehicle. Sensor fusion may be typified as a computational framework for the aggregation, analysis and alliance of data that originates from heterogeneous or homogeneous sources (e.g., the multiple distinct sensor types discussed above with respect to FIG. 1). Sensor fusion may be embodied as a dedicated software appliance that intelligently combines data from several sensors and corrects for the deficiencies of the individual sensors to calculate completely accurate and intelligible position and orientation information. In accord with the above example, the CPU 36 fuses each data type (e.g., relative target object speed data as sensed by the range sensor 64) with other complementary data types (speed data received from other onboard and off-board data sources) to establish a corresponding fused attribute for a target object (e.g., relative speed). From the comprehensive sensor-fusion-based results generated at block 409, the method 400 calculates whether or not a target object under scrutiny will enter (cut in) or exit (cut out) the predicted path of the host vehicle, at process block 411.

At process block 413, fused cut-in/cut-out prediction data generated at process block 411 is subjected to a correction Kalman filter, e.g., to remediate unwanted sensor gain and sensor error, and then processed with a prediction Kalman filter to estimate position and velocity of the target object, at process block 415. In a non-limiting example, the prediction Kalman filter of block 415 predicts values for designated attributes of a target object for a given track of road over a given timeframe. The method 400 may then compare actual target behavior with predicted target behavior, and from that comparison derive a measure of understanding for future estimation of how the target object will behave. Correction Kalman filter of block 413 is designed to at least partially offset or otherwise help to compensate for time delays within the system (e.g., signal transmission delays, internal processing latencies, etc.). At process block 417, the method conducts an object threat selection and assessment. In particular, the method 400 makes a determination of whether or not a tracked object poses a threat to the vehicle and, if so, evaluates the level of threat.

Aspects of this disclosure may be implemented, in some embodiments, through a computer-executable program of instructions, such as program modules, generally referred to as software applications or application programs executed by an onboard vehicle computer or a distributed network of resident and remote computing devices. The software may include, in non-limiting examples, routines, programs, objects, components, and data structures that perform particular tasks or implement particular abstract data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by remote-processing devices that are linked through a communications network. In a distributed-computing environment, program modules may be located in both local and remote computer-storage media including memory storage devices. Aspects of the present disclosure may therefore, be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, control logic, or method disclosed herein may be embodied in software stored on a tangible medium such as, for example, a flash memory, a CD-ROM, a floppy disk, a hard drive, a digital versatile disk (DVD), or other memory devices; persons of ordinary skill in the art will readily appreciate that the entire algorithm, control logic, or method, and/or parts thereof, may alternatively be executed by a device other than a controller and/or embodied in firmware or dedicated hardware in an available manner (e.g., it may be implemented by an application specific integrated circuit (ASIC), a programmable logic device (PLD), a field programmable logic device (FPLD), discrete logic, etc.). Further, although specific algorithms are described with reference to flowcharts depicted herein, there are many other methods of implementing the example machine readable instructions that may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method for controlling an automated driving operation of a motor vehicle, the method comprising:
   determining, via a resident vehicle controller of the motor vehicle, path plan data for the motor vehicle, the path plan data including a vehicle location and a predicted route;
   receiving, from a distributed network of onboard sensing devices of the motor vehicle, sensor data indicative of an object position and object dynamics of a target object;
   applying a sensor fusion module to the received sensor data to determine: a threat confidence value predictive of intrusion of the target object with respect to the vehicle location and predicted route of the motor vehicle, and a predicted intrusion location of the target object with respect to the predicted route of the motor vehicle;
   executing an iterative prediction and correction protocol to determine a refined variation of the predicted intrusion location of the target object;
   determining an updated variation of the threat confidence value based on the refined variation of the predicted intrusion location;
   determining, via the resident vehicle controller, if the threat confidence value and refined variation of the threat confidence value are greater than a first calibrated threshold value; and
   transmitting, via the resident vehicle controller in response to both the threat confidence value and the refined variation of the threat confidence value being greater than the first calibrated threshold value, a first command signal to a first vehicle dynamics system to take a first preventive action.

2. The method of claim 1, further comprising:
   determining, via the resident vehicle controller in response to the threat confidence value not being greater than the first calibrated threshold value, if the threat confidence value is greater than a second calibrated threshold value; and
   transmitting, via the resident vehicle controller in response to the threat confidence value being greater than the second calibrated threshold value, a second command signal to a second vehicle dynamics system to take a second preventive action.

3. The method of claim 2, wherein the first command signal includes a braking command, the first vehicle dynamics system includes a brake system of the motor vehicle, and the first preventive action includes a braking maneuver, and wherein the second command signal includes a speed scrubbing command, the second vehicle dynamics system includes a powertrain system of the motor vehicle, and the second preventive action includes a torque reduction action.

4. The method of claim 2, further comprising:
   determining, via the resident vehicle controller, if the refined variation of the threat confidence value is greater than the second calibrated threshold value, wherein transmitting the second command signal to the second vehicle dynamics system to take the second preventive action is further in response to the refined variation of the threat confidence value being greater than the second calibrated threshold value.

5. The method of claim 1, wherein each of the onboard sensing devices generates a respective portion of the sensor data with respect to a respective coordinate frame, the method further comprising conditioning the received sensor data to interrelate the respective coordinate frames of the onboard sensing devices with a common coordinate frame.

6. The method of claim 5, further comprising executing a data association protocol to classify the respective portion of the sensor data received from each of the onboard sensing devices to correlate related ones of the respective portions of the sensor data.

7. The method of claim 6, further comprising:
determining a preliminary fused cut-in/cut-out prediction value;
processing the preliminary fused cut-in/cut-out prediction value with a correction Kalman filter to remediate sensor gain and sensor error; and
processing the preliminary fused cut-in/cut-out prediction value with a prediction Kalman filter to estimate position and velocity of the target object.

8. The method of claim 1, further comprising:
receiving, from the distributed network of onboard sensing devices of the motor vehicle, second sensor data indicative of a second object position and second object dynamics of a second target object;
receiving, via the resident vehicle controller, behavioral data for the target object and the second target object; and
applying another sensor fusion module to the received sensor data, second sensor data and behavioral data to estimate a collision between the target object and the second target object within or proximate to the vehicle location and predicted route of the motor vehicle.

9. The method of claim 1, wherein the iterative prediction and correction protocol further determines a relative velocity between the motor vehicle and the target object.

10. A method for controlling an automated driving operation of a motor vehicle, the method comprising:
determining, via a vehicle controller of the motor vehicle, path plan data for the motor vehicle, the path plan data including a vehicle location and a predicted route;
receiving, from a distributed network of sensing devices of the motor vehicle, sensor data indicative of an object position and object dynamics of a target object, each of the sensing devices generating a respective portion of the sensor data with respect to a respective coordinate frame;
conditioning the received sensor data to interrelate the respective coordinate frames of the sensing devices with a common coordinate frame;
classifying the respective portion of the sensor data received from each of the onboard sensing devices to correlate related ones of the respective portions of the sensor data;
determining a preliminary fused cut-in/cut-out prediction value;
processing the preliminary fused cut-in/cut-out prediction value with a correction Kalman filter to remediate sensor gain and sensor error;
processing the preliminary fused cut-in/cut-out prediction value with a prediction Kalman filter to estimate position and velocity of the target object;

applying a sensor fusion module to the received sensor data to determine a threat confidence value predictive of intrusion of the target object with respect to the motor vehicle;
determining, via the resident vehicle controller, if the threat confidence value is greater than a first calibrated threshold value; and
transmitting, via the resident vehicle controller in response to the threat confidence value being greater than the first calibrated threshold value, a first command signal to a first vehicle dynamics system to take a first preventive action.

11. The method of claim 10, further comprising:
determining, in response to the threat confidence value not being greater than the first calibrated threshold value, if the threat confidence value is greater than a second calibrated threshold value; and
transmitting, in response to the threat confidence value being greater than the second calibrated threshold value, a second command signal to a second vehicle dynamics system to take a second preventive action.

12. The method of claim 11, wherein the first command signal includes a braking command, the first vehicle dynamics system includes a brake system of the motor vehicle, and the first preventive action includes a braking maneuver, and wherein the second command signal includes a speed scrubbing command, the second vehicle dynamics system includes a powertrain system of the motor vehicle, and the second preventive action includes a torque reduction action.

13. The method of claim 10, further comprising:
receiving, from the distributed network of sensing devices, second sensor data indicative of a second object position and second object dynamics of a second target object;
receiving, via the vehicle controller, behavioral data for the target object and the second target object; and
applying another sensor fusion module to the received sensor data, second sensor data and behavioral data to estimate a collision between the target object and the second target object within or proximate to the vehicle location and predicted route of the motor vehicle.

14. The method of claim 10, further comprising applying the sensor fusion module to the received sensor data to determine a predicted intrusion location of the target object with respect to the predicted route of the motor vehicle.

15. The method of claim 14, further comprising executing an iterative prediction and correction protocol to determine a refined variation of the predicted intrusion location of the target object.

16. The method of claim 15, wherein the iterative prediction and correction protocol further determines a relative velocity between the motor vehicle and the target object.

17. The method of claim 15, further comprising:
determining an updated variation of the threat confidence value based on the refined variation of the predicted intrusion location; and
determining, via the resident vehicle controller, if the refined variation of the threat confidence value is greater than the first calibrated threshold value,
wherein transmitting the first command signal to the first vehicle dynamics system to take the first preventive action is further in response to the refined variation of the threat confidence value being greater than the first calibrated threshold value.

18. The method of claim 17, further comprising:
determining, via the resident vehicle controller in response to the threat confidence value not being greater than the first calibrated threshold value, if the threat confidence value is greater than a second calibrated threshold value; and transmitting, via the resident vehicle controller in response to the threat confidence value being greater than the second calibrated threshold value, a second command signal to a second vehicle dynamics system to take a second preventive action.

19. The method of claim 18, further comprising:

determining, via the resident vehicle controller, if the refined variation of the threat confidence value is greater than the second calibrated threshold value, wherein transmitting the second command signal to the second vehicle dynamics system to take the second preventive action is further in response to the refined variation of the threat confidence value being greater than the second calibrated threshold value.

* * * * *